US010877502B2

(12) United States Patent
Ivanov et al.

(10) Patent No.: US 10,877,502 B2
(45) Date of Patent: *Dec. 29, 2020

(54) INPUT DEPENDENT VOLTAGE REGULATOR WITH A CHARGE PUMP

(71) Applicant: TEXAS INSTRUMENTS INCORPORATED, Dallas, TX (US)

(72) Inventors: Vadim Valerievich Ivanov, Tucson, AZ (US); Srinivas K. Pulijala, Tucson, AZ (US); Siva Kumar Sudani, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/058,022

(22) Filed: Aug. 8, 2018

(65) Prior Publication Data

US 2019/0107857 A1    Apr. 11, 2019

Related U.S. Application Data

(63) Continuation of application No. 15/727,779, filed on Oct. 9, 2017, now Pat. No. 10,073,478.

(51) Int. Cl.
*G05F 1/595*   (2006.01)
*H02M 3/07*   (2006.01)
*G05F 1/575*   (2006.01)

(52) U.S. Cl.
CPC .............. *G05F 1/595* (2013.01); *G05F 1/575* (2013.01); *H02M 3/07* (2013.01)

(58) Field of Classification Search
CPC ............ G05F 1/56; G05F 1/595; G05F 1/575; H02M 3/07

(Continued)

(56) References Cited

U.S. PATENT DOCUMENTS 6,300,820 B1 * 10/2001 Fotouhi .................. H02M 3/07
                                                                  327/536
6,438,005 B1 *  8/2002 Walker .................... H02M 3/07
                                                                  363/60

(Continued)

OTHER PUBLICATIONS

S. Alenin, D. Spady, V. Ivanov, "A low ripple on-chip charge pump for bootstrapping of the noise-sensitive nodes", 2006 IEEE International Symposium on Circuits and Systems, pp. 5319-5322, DOI: 10.1109/ISCAS.2006.1693834.

*Primary Examiner* — Thienvu V Tran
*Assistant Examiner* — Nusrat Quddus
(74) *Attorney, Agent, or Firm* — John R. Pessetto; Charles A. Brill; Frank D. Cimino

(57) ABSTRACT

A voltage regulator includes a first transistor including a first terminal to receive an input voltage and a second transistor including a first terminal coupled to a second terminal of the first transistor. A charge pump couples to the second transistor and to an output voltage node. An amplifier receives a feedback voltage derived from the output voltage and generates a control signal to gates of the transistors. Responsive to the input voltage being more than a threshold larger than the output voltage, the amplifier maintains the second transistor off and the first transistor on such that current flows through the first transistor to the output voltage node but not the second transistor. Responsive to the input voltage being less than the threshold amount, the amplifier operates the first transistor in a triode mode and turns on the second transistor to provide current to the charge pump.

4 Claims, 2 Drawing Sheets

(58) Field of Classification Search
USPC .......................................... 323/271–279, 315
See application file for complete search history.

(56) References Cited

U.S. PATENT DOCUMENTS

| | | | | |
|---|---|---|---|---|
| 7,319,311 B2* | 1/2008 | Nishida | ................ | H01M 10/44 |
| | | | | 323/268 |
| 7,566,828 B2* | 7/2009 | Sasaki | ................ | H02J 7/35 |
| | | | | 136/243 |
| 7,759,905 B2* | 7/2010 | Liu | ................ | H02J 7/0052 |
| | | | | 320/162 |
| 7,948,221 B2* | 5/2011 | Watanabe | ................ | H02M 3/158 |
| | | | | 307/110 |
| 8,063,606 B2* | 11/2011 | Veselic | ................ | H02J 7/045 |
| | | | | 320/119 |
| 8,269,468 B2* | 9/2012 | Ju | ................ | H02J 7/0072 |
| | | | | 320/150 |
| 8,368,475 B2* | 2/2013 | Nakada | ................ | H02M 1/08 |
| | | | | 323/237 |
| 8,773,099 B2* | 7/2014 | Granger | ................ | H02M 3/1588 |
| | | | | 323/284 |
| 8,847,511 B1* | 9/2014 | Cheng | ................ | H05B 45/37 |
| | | | | 315/291 |
| 9,327,321 B2* | 5/2016 | Chen | ................ | B65D 19/385 |
| 9,859,737 B2* | 1/2018 | Chen | ................ | B65D 19/385 |
| 10,073,478 B1* | 9/2018 | Ivanov | ................ | G05F 1/595 |
| 2003/0174524 A1* | 9/2003 | Botker | ................ | H02M 3/07 |
| | | | | 363/60 |
| 2008/0290852 A1* | 11/2008 | Ogawa | ................ | G11C 16/30 |
| | | | | 323/283 |
| 2009/0033289 A1* | 2/2009 | Xing | ................ | H02J 7/0065 |
| | | | | 320/140 |
| 2009/0059630 A1* | 3/2009 | Williams | ................ | H02M 3/07 |
| | | | | 363/60 |
| 2011/0221413 A1* | 9/2011 | Pigott | ................ | H02M 3/1588 |
| | | | | 323/283 |
| 2013/0033244 A1 | 2/2013 | Ock | | |
| 2014/0266099 A1* | 9/2014 | Ku | ................ | H02M 1/36 |
| | | | | 323/273 |
| 2015/0215006 A1* | 7/2015 | Mehas | ................ | H04B 5/0037 |
| | | | | 307/104 |
| 2015/0309518 A1* | 10/2015 | Nagda | ................ | G05F 1/468 |
| | | | | 323/274 |
| 2015/0311735 A1* | 10/2015 | Shimada | ................ | H02J 7/0052 |
| | | | | 320/107 |
| 2015/0311783 A1* | 10/2015 | Saadat | ................ | G05F 1/577 |
| | | | | 323/267 |
| 2017/0063223 A1* | 3/2017 | Raghupathy | ................ | H02M 3/07 |

\* cited by examiner

INPUT DEPENDENT VOLTAGE REGULATOR WITH A CHARGE PUMP

CROSS-REFERENCE TO RELATED APPLICATION(S)

This continuation application claims priority to U.S. patent application Ser. No. 15/727,779, filed Oct. 9, 2017, which application is incorporated herein by reference in its entirety.

BACKGROUND

Various types of voltage regulators are available. A low dropout (LDO) linear voltage regulator is an electronic circuit that is designed to provide a stable direct current (DC) output voltage regardless of input voltage variations and load impedance. An LDO regulator is able to maintain output regulation even for a relatively small difference between the input voltage and the output voltage. For example, when regulating the voltage from a battery, an LDO regulator can maintain a steady output voltage for input voltages ranging from high battery voltages down to voltage levels just above the output voltage. Some LDO regulators may use a field effect transistor (FET) as a current pass element, with the FET behaving as a resistor and to generate a controlled voltage across its terminals to maintain the desired output voltage. As the load current or input voltage changes, the gate to source voltage of the FET is adjusted by a control circuit to keep the output in regulation. The FET operates in the saturation region as long as it has a large drain resistance, but if the input voltage drops close to the output voltage, the FET enters the trioding region and the LDO is in "dropout."

SUMMARY

In accordance with at least one embodiment, a voltage regulator includes a first transistor including a first terminal to receive an input voltage. A second transistor is included and comprises a first terminal coupled to a second terminal of the first transistor. A charge pump couples to a second terminal of the second transistor and to an output voltage node. An amplifier receives a feedback voltage derived from the output voltage and generates a control signal to the gates of the transistors. Responsive to the input voltage being more than a threshold larger than the output voltage, the amplifier maintains the second transistor off and the first transistor on such that current flows through the first transistor to the output voltage node but not the second transistor. Responsive to the input voltage being less than the threshold amount, the amplifier operates the first transistor in a triode mode and turns on the second transistor to provide current to the charge pump.

Another embodiment is directed to a voltage regulator that includes a first transistor comprising a first terminal configured to receive an input voltage. A current mode charge pump is coupled to a second terminal of the second transistor and to an output voltage node. An amplifier is configured to receive a feedback voltage derived from the output voltage and is configured to generate a control signal to provide to a control input of the first transistor. Responsive to the input voltage being more than a threshold amount larger than the output voltage, the amplifier is configured to maintain the first transistor in an on state such that current flows through the first transistor to the output voltage node. Responsive to the input voltage being less than the threshold amount larger than the output voltage, the amplifier is configured to operate the first transistor in a triode mode to cause current to flow through the current mode charge pump to the output voltage node.

Yet another embodiment is directed to a method that comprises configuring a voltage regulator for a low dropout operational mode in which a first transistor coupled to a charge pump is turned off thereby precluding current from flowing through the charge pump. The method further comprises detecting whether the input voltage is less than a first threshold. Responsive to detection that the input voltage is greater than the first threshold, the method includes turning on the first transistor so that current flows through the charge pump to a load.

BRIEF DESCRIPTION OF THE DRAWINGS

For a detailed description of various examples, reference will now be made to the accompanying drawings in which.

DETAILED DESCRIPTION

In accordance with the disclosed embodiments, a voltage regulator includes a charge pump. The charge pump permits the output voltage produced by the voltage regulator to remain at a fixed level despite the input voltage approaching and even falling below the output voltage. In some embodiments, the charge pump exhibits little if any switching ripple. When the input voltage is higher than the output voltage, the voltage regulator operates in an LDO mode in which the output voltage is maintained at a constant level despite the input voltage falling to a level that may be close to the output voltage. At that point, at least some of the load current may begin to flow through the charge pump to the load so as to maintain the output voltage at the constant level. The disclosed voltage regulator exhibits a smooth transition between the LDO and the charge pump operational configurations with little, if any, output ripple.

Figure 1:
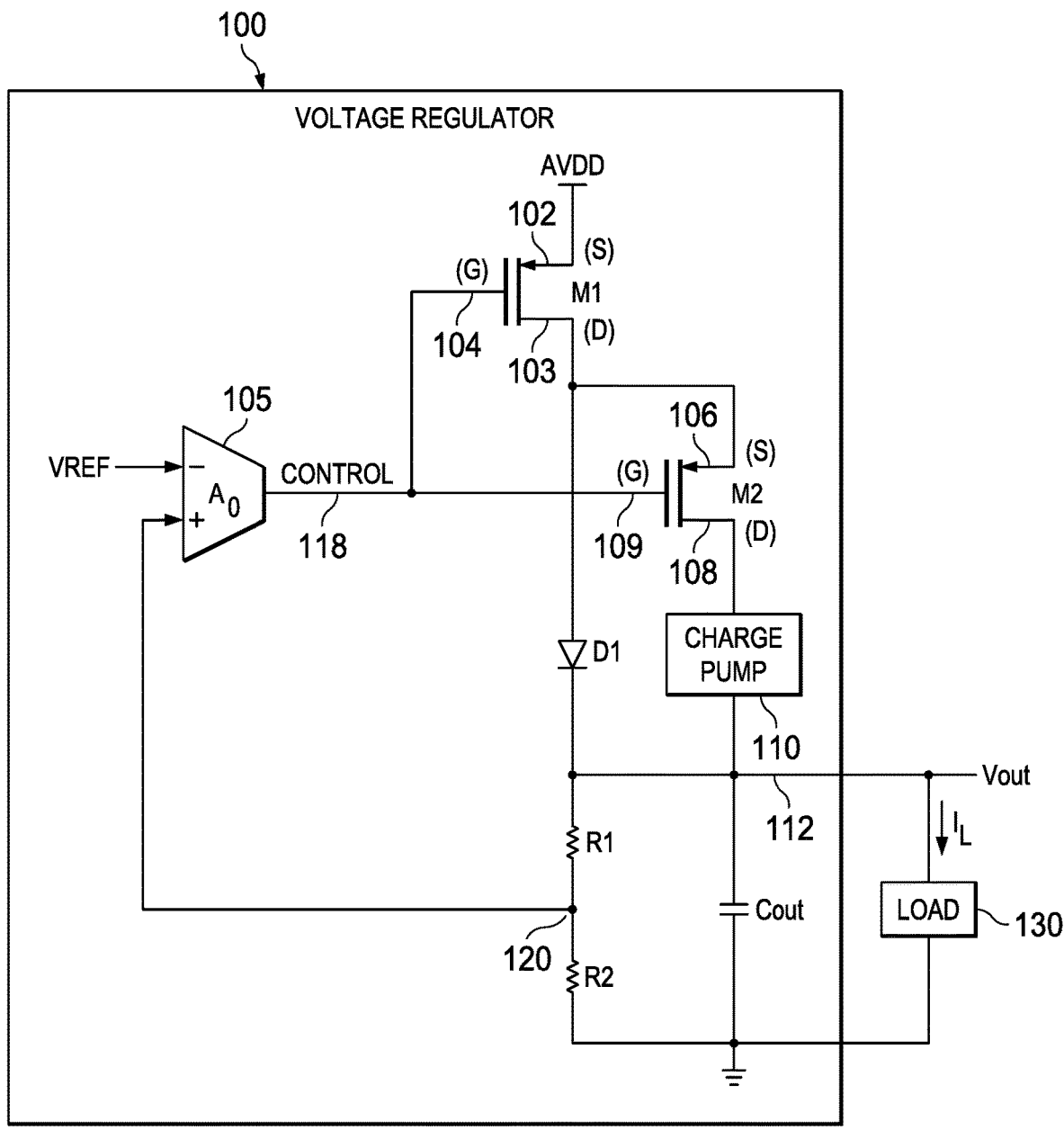
FIG. 1 illustrates a schematic of an LDO voltage regulator with a charge pump in accordance with various examples.

FIG. 1 shows an example of a voltage regulator 100 comprising transistors M1 and M2, a current mode charge pump 110, a diode D1, resistors R1 and R2, an output capacitor Cout, and an error amplifier 105. An input voltage designated as AVDD is provided to the voltage regulator 100 and an output voltage (Vout) is generated on an output voltage node 112. The voltage regulator 100 may generate a constant voltage to a load 130 to thereby drive the load. Transistor M1 includes a first terminal 102 (e.g., a source) which is configured to receive the input voltage (AVDD). Transistor M1 includes a second terminal 103 (e.g., a drain) and a third terminal 104 (e.g., a gate). Similarly, transistor M2 includes a first terminal 106 (e.g., a source), a second terminal 108 (e.g., a drain), and a third terminal 109 (e.g., a gate). In this illustrative circuit, terminal 106 of M2 is coupled to terminal 103 of M1.

The current mode charge pump 110 is coupled to terminal 108 of M2 as well as to the output voltage node 112 on which the output voltage Vout is generated by the voltage regulator 100. Current from the input voltage AVDD can flow to the load 130 through either or both of two current paths. One path is through M1 and diode D1 and another path is through M1, M2, and the current mode charge pump 110.

Resistors R1 and R2 are connected in series between the output voltage node 112 and ground as shown. The node 120 interconnecting the two resistors provides a feedback voltage which is derived from the output voltage Vout and is provided to an input (e.g., positive input) of the error amplifier 104. A reference signal (VREF) is provided to the other error amplifier input (e.g., the negative input). The error amplifier 104 is configured to generate a control signal 118 (CONTROL) to provide to the gates of M1 and M2. As the gate terminals 104 and 109 of M1 and M2 are connected together, both transistors receive the same CONTROL signal. The CONTROL signal 118 controls the operating mode (on, off, triode region, saturation region, etc.) of the transistors M1 and M2 as described herein.

Responsive to the input voltage (AVDD) being more than a threshold amount larger than the output voltage (Vout), the error amplifier 105 is configured to maintain M2 in an off state and M1 in an on state such that current flows through M1 and D1 to the output voltage node 112 and to the load, but not through M2. While in this mode of operation (M1 on and M2 off), the voltage regulator 100 operates as an LDO voltage regulator. That is, any changes in the impedance of the load 130, which would result in a change in load current ($I_L$) and a change in Vout, will be corrected by the error amplifier 105 based on the feedback voltage from node 120. The error amplifier will adjust the voltage of the CONTROL signal 118 to thereby adjust M1's gate-to-source voltage ($V_{GS}$) to thereby maintain a constant drain-to-source voltage ($V_{DS}$) and adjust the drain current of M1 to match the load current $I_L$.

Further, even as the input voltage AVDD itself begins to change (e.g., drops), the voltage regulator 100 continues to maintain a constant output voltage Vout. The error amplifier 105 will adjust the voltage of the CONTROL signal 118 to the gate terminal 104 of M1 to attempt to maintain a constant gate-to-source voltage ($V_{GS}$). By the error amplifier adjusting the gate voltage of M1 to maintain the transistor's VGS at a constant level, a constant amount of current will flow through M1 from source to drain and thus through diode D1 to load 130. Thus, while in the LDO mode of operation, the voltage regulator continues to regulate the output voltage to the proper level despite a drop in the input voltage.

As the input voltage AVDD continues to drop even more (e.g., as a battery discharges), at some point, the input voltage will be at a low enough level that M1 will be in "dropout" and unable to regulate the load current at the desired constant level. The $V_{DS}$ voltage of M1 will be at its minimum level. However, responsive to the input voltage AVDD being less than a threshold amount larger (e.g., minimum $V_{DS}$) than the output voltage Vout, the error amplifier 105 will operate M1 in a triode mode and turn on M2 to provide current to the current mode charge pump 110. At this point, current flows from the input voltage through two current paths to the load 130—one current path comprising M1 and diode D1 and the other current path comprising M1 and M2. That is, as AVDD begins to approach Vout, M1 begins to triode and its VGS begins to increase. As a result, the source terminal 106 of M2 will be high enough with its gate terminal 109 low so that M2 starts to turn on, and initially part of the load current $I_L$ starts to flow through M2 and the current charge pump 110 to the load. Eventually AVDD becomes low enough so as to cause all of the load current to flow through M2 to the charge pump. With the current mode charge pump 110, the output voltage Vout remains in regulation.

Figure 2:
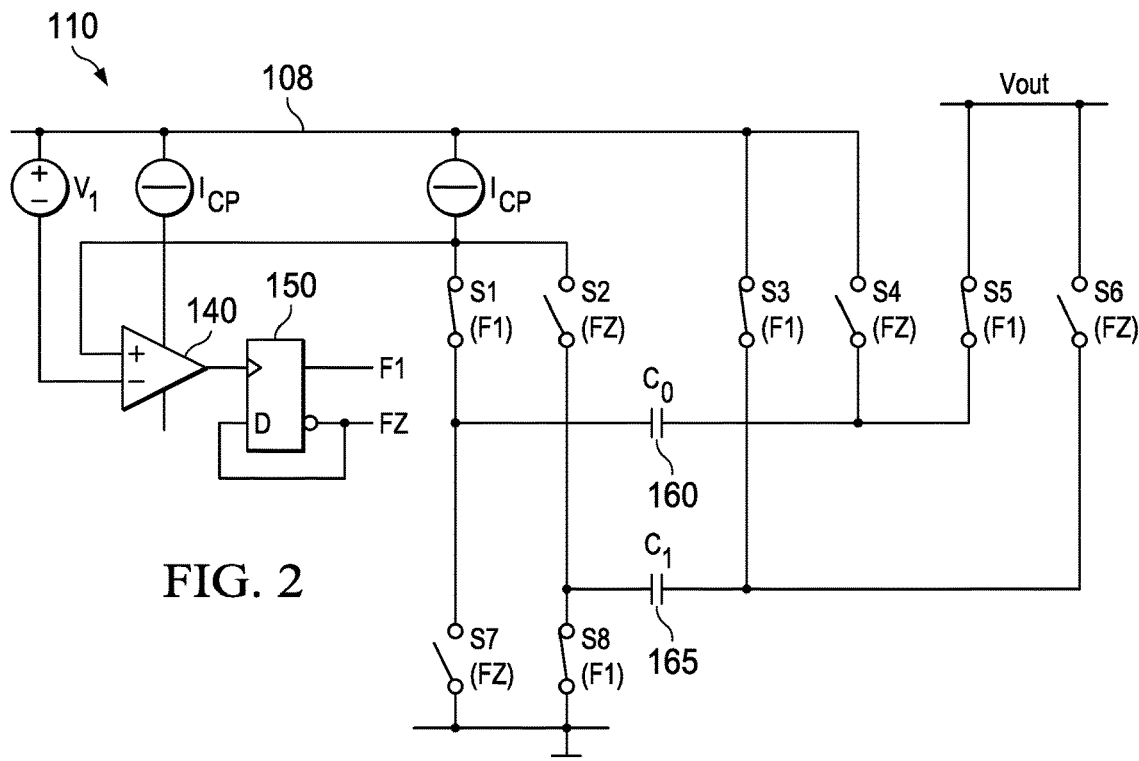
FIG. 2 shows a charge pump circuit usable for the LDO voltage regulator of FIG. 1 in accordance with various examples.

Any of a variety of circuits can be used to implement the current mode charge pump 110. FIG. 2 shows an example current mode charge pump circuit 110. In this example, the charge pump includes a comparator 140, a flip-flop 150, switches S1-S8, and capacitors $C_0$ and $C_1$. As described below, the capacitors are reciprocally charged and discharged with one of the capacitors being coupled to and discharged to the load while the other capacitor is being charged. The capacitors may be referred to as "flying capacitors."

The flip-flop 150 produces a non-inverting output F1 and an inverting output FZ (i.e., FZ has the opposite logic state as F1). The non-inverting output F1 is used to control switches S1, S3, S5 and S8, which are shown in the closed state due to, for example, F1 being asserted high. The inverting output FZ is used to control the remaining switches S2, S4, S6, and S7, which are shown in the open state due to FZ not being asserted high. As such, when F1 is asserted to its active state (e.g., high) and FZ is at its inactive state (e.g., low), switches S1, S3, S5, and S8 are closed and switches S2, S4, S6, and S7 are open. Then, when the flip-flop 150 changes state and F1 becomes inactive and FZ is asserted to its active state, switches S2, S4, S6, and S7 are closed and switches S1, S3, S5, and S8 are open.

As noted above, when AVDD drops to a low enough level, all of the load current flows through M2 and the current mode charge pump 110. Thus, $I_{CP}$ in FIG. 2 is a constant current and equal to the load current $I_L$. Assuming F1 is active high (so as to close switches S1, S3, S5, and S8) and FZ is low (so as to open switches S2, S4, S6, and S7), $I_{CP}$ current flows through the node interconnecting M2 to the charge pump 110 (i.e., drain terminal 108) and through switch S1, capacitor $C_0$, and switch S5 to Vout. The capacitor $C_0$ discharges and the load current is maintained at a constant level. While load current flows through capacitor $C_0$, the other capacitor $C_1$ is charged by charge current flow through the current path comprising switch S3, capacitor $C_1$, and switch S8.

The voltage on the left plate 160 of capacitor $C_0$ is compared to a reference voltage by comparator 140. The reference voltage is generally equal to AVDD-$V_1$. When the voltage on the left plate 160 of capacitor $C_0$ drops below the reference voltage, the comparator 140 causes the flip-flop 150 to change state and F1 becomes low and FZ becomes active high. At that point switches S1, S3, S5, and S8 are forced open and switches S2, S4, S6, and S7 are forced closed. In this configuration load current continues to flow to Vout but through a current path comprising switch S2, capacitor $C_1$, and switch S6. Further, because switches S4 and S7 are now closed, capacitor C0 begins to charge. The process repeats. The charge pump 110 operates with little or no switching ripple on the output voltage Vout.

The illustrative current mode charge pump 110 of FIG. 2 is self-switching with the use of the comparator 140, although an external clock can be used to control the state of the flip-flop 150. The charge pump 110 is able to achieve an output voltage Vout that is twice the input voltage AVDD. As such, with the current mode charge pump 110, the voltage regulator 100 is able to maintain regulation with the input voltage AVDD being, for example, as low as one-half the output voltage.

Figure 3:
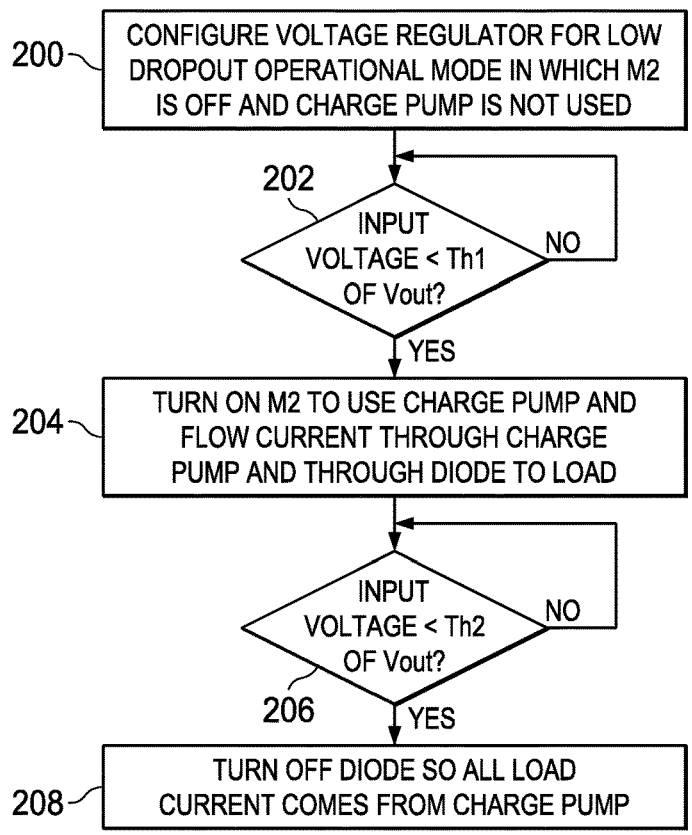
FIG. 3 illustrates a method in accordance with various examples.

FIG. 3 shows a method in accordance with the disclosed embodiments. The operations may be performed in the order shown, or in a different order. Further, the operations may be performed sequentially, or two or more of the operations may be performed concurrently. At 200, the method includes configuring the voltage regulator for the low dropout operational mode in which transistor M2 is off thereby precluding use of the current mode charge pump. Instead, transistor M1 is controlled by the error amplifier 105 to regulate the output voltage Vout.

As long as the input voltage is greater than a threshold level (TH1) of the output voltage (e.g., greater than the minimum $V_{DS}$ above Vout), then M2 remains off. However, when the input voltage falls below Th1 (as detected at 202), then the voltage regulator is reconfigured so that M2 begins to turn on to thereby use the charge pump 110. As a result, current begins to flow through M2 and the charge pump to the load 130, as well as through the diode D1 which is coupled in parallel with the connection of M2 and the charge pump 110 as shown in the example of FIG. 1. The charge pump 110 helps to maintain the output voltage at its regulated level despite the input voltage being too small to regulate the output voltage in the LDO operational mode.

If and when the input voltage drops below a second threshold level (Th2), the diode D1 turns off. The second threshold Th2 may be the on-voltage of the diode D1 (e.g., 0.6V) greater than the output voltage (Vout). As long as the input voltage is above Th2, but below Th1, the diode D1 remains on and current flows to the load through one path including the diode D1 and another path including M2 and the charge pump 110. Once the input voltage falls below Th2, the diode turns off and all of the load current flows to the load from the charge pump 110.

Certain terms are used throughout the following description and claims to refer to particular system components. Different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A voltage regulator, comprising:
   a first transistor comprising a first terminal configured to receive an input voltage;
   a second transistor comprising a first terminal coupled to a second terminal of the first transistor;
   a current mode charge pump coupled to a second terminal of the second transistor and to an output voltage node; and
   an amplifier configured to receive a feedback voltage derived from the output voltage and configured to generate a control signal to provide to gates of the first and second transistors;
   wherein the current mode charge pump circuit comprises:
   a first plurality of switches;
   a second plurality of switches;
   a flip-flop coupled to the first and second pluralities of switches;
   a first capacitor; and
   a second capacitor;
   wherein the flip-flop is configured to generate a pair of control signals that cause the first plurality of switches to couple the first capacitor to the output voltage node and charge the second capacitor while disconnecting the second capacitor from the output voltage node.

2. The voltage regulator of claim 1, wherein the current mode charge pump includes a comparator that is configured to compare a voltage from the first capacitor to a reference signal and, responsive to a comparison of the reference signal to the first capacitor voltage, to change a state of the pair of control signals such that the first plurality of switches couple the second capacitor to the output voltage node and charge the first capacitor while disconnecting the first capacitor from the output voltage node.

3. A voltage regulator, comprising:
   a first transistor comprising a first terminal configured to receive an input voltage;
   a current mode charge pump coupled to an output voltage node;
   an amplifier configured to receive a feedback voltage derived from the output voltage and configured to generate a control signal to provide to a control input of the first transistor;
   a second transistor including:
   a first terminal coupled to a second terminal of the first transistor;
   a second terminal coupled the charge pump;
   a control input coupled to the control input of the first transistor and configured to receive the control signal from the amplifier; and
   a diode comprising an anode and a cathode, wherein the anode is coupled to a second terminal of the first transistor and wherein the cathode is coupled to the output voltage node;
   further comprising the second transistor coupled to the first transistor and the current mode charge pump;
   wherein the current mode charge pump circuit comprises:
   a first plurality of switches;
   a second plurality of switches;
   a flip-flop coupled to the first and second pluralities of switches;
   a first capacitor; and
   a second capacitor;
   wherein the flip-flop is configured to generate a pair of control signals that cause the first plurality of switches to couple the first capacitor to the output voltage node and charge the second capacitor while disconnecting the second capacitor from the output voltage node.

4. The voltage regulator of claim 3, wherein the current mode charge pump includes a comparator that is configured to compare a voltage from the first capacitor to a reference signal and, responsive to a comparison of the reference signal to the first capacitor voltage, to change a state of the pair of control signals such that the first plurality of switches couple the second capacitor to the output voltage node and charge the first capacitor while disconnecting the first capacitor from the output voltage node.

* * * * *